United States Patent
Austin et al.

(10) Patent No.: US 12,475,611 B2
(45) Date of Patent: Nov. 18, 2025

(54) SYSTEMS AND METHODS FOR SUPERIMPOSING AUGMENTED REALITY VEHICLE LIGHTS IN A VEHICLE DISPLAY

(71) Applicant: Toyota Motor Engineering & Manufacturing North America, Inc., Plano, TX (US)

(72) Inventors: Benjamin Piya Austin, Saline, MI (US); Rohit Gupta, Santa Clara, CA (US); William Patrick Garrett, Plymouth, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 161 days.

(21) Appl. No.: 18/526,511

(22) Filed: Dec. 1, 2023

(65) Prior Publication Data

US 2025/0182339 A1 Jun. 5, 2025

(51) Int. Cl.
*G06T 11/00* (2006.01)
*B60R 1/24* (2022.01)
*G06V 20/59* (2022.01)

(52) U.S. Cl.
CPC ............... *G06T 11/00* (2013.01); *B60R 1/24* (2022.01); *B60R 2300/205* (2013.01); *B60R 2300/605* (2013.01); *G06V 20/597* (2022.01)

(58) Field of Classification Search
CPC ......... G06T 11/00; B06R 1/24; G06V 20/597; B60R 2300/205; B60R 2300/605
See application file for complete search history.

(56) References Cited

U.S. PATENT DOCUMENTS 9,013,293 B2 4/2015 Pimentel
9,047,703 B2 6/2015 Beckwith et al.
(Continued)

FOREIGN PATENT DOCUMENTS

CN 110466529 A 11/2019
CN 112277789 A 1/2021
(Continued)

OTHER PUBLICATIONS

Jasoren. "How AR works and what it is—Jasoren", Retrieved from the Internet: <https://jasoren.com/what-augmented-reality-is-and-how-it-works-the-ultimate-tutorial/>, Retrieved Dec. 1, 2023.

*Primary Examiner* — Terrell M Robinson
(74) *Attorney, Agent, or Firm* — Christopher G. Darrow; Darrow Mustafa PC

(57) ABSTRACT

Systems, methods, and other embodiments described herein relate to superimposing computer-generated exterior vehicle lights over asynchronous real-world exterior vehicle lights to reduce a sensory overload of a vehicle driver. In one embodiment, a method includes assessing a sensory environment of a vehicle driver. The method also includes determining that the vehicle driver is in a sensory-overloaded state based on 1) a characteristic of the sensory environment, 2) physiological sensor data for the vehicle driver, and 3) driving behavior sensor data. The method also includes superimposing an augmented reality (AR) overlay of computer-generated synchronized exterior vehicle lights over asynchronous real-world exterior vehicle lights viewed through an AR display device of the vehicle based on a determination that the vehicle driver is in the sensory-overloaded state.

20 Claims, 8 Drawing Sheets

(56) References Cited

U.S. PATENT DOCUMENTS

| | | |
|---|---|---|
| 9,662,015 B2 | 5/2017 | Proud et al. |
| 9,751,534 B2 | 9/2017 | Fung et al. |
| 9,881,503 B1 | 1/2018 | Goldman-Shenhar et al. |
| 10,046,618 B2 | 8/2018 | Kirsch et al. |
| 10,235,882 B1 | 3/2019 | Aoude et al. |
| 10,547,988 B2 | 1/2020 | Oh et al. |
| 10,777,083 B2 | 9/2020 | Rau et al. |
| 10,850,746 B2 | 12/2020 | Marti et al. |
| 10,885,785 B2 | 1/2021 | Xu et al. |
| 10,911,915 B2 | 2/2021 | Woo et al. |
| 11,021,103 B2 | 6/2021 | Haar et al. |
| 11,172,492 B2 | 11/2021 | Zhang et al. |
| 11,260,791 B2 | 3/2022 | Leaming et al. |
| 11,533,586 B2 | 12/2022 | Balasubramanian et al. |
| 11,557,234 B1* | 1/2023 | Eudy ................. B60K 35/60 |
| 11,571,969 B2 | 2/2023 | Domeyer et al. |
| 11,699,250 B1* | 7/2023 | McCann .............. B60K 35/25 |
| | | 345/628 |
| 12,251,994 B1* | 3/2025 | Balasubramanyan ................ |
| | | G06V 40/18 |
| 2005/0024196 A1 | 2/2005 | Moore |
| 2005/0117364 A1 | 6/2005 | Rennick et al. |
| 2012/0212320 A1 | 8/2012 | Oberholtzer |
| 2015/0077826 A1* | 3/2015 | Beckman ............ H04N 23/687 |
| | | 359/601 |
| 2017/0315825 A1 | 11/2017 | Gordon et al. |
| 2018/0024359 A1* | 1/2018 | Yoneyama ............ B60K 35/60 |
| | | 345/9 |
| 2018/0043756 A1* | 2/2018 | Kaphengst ................ B60J 3/04 |
| 2018/0314066 A1* | 11/2018 | Bell .................... G09G 5/10 |
| 2020/0202535 A1* | 6/2020 | Lee ...................... H04N 5/145 |
| 2021/0046822 A1 | 2/2021 | Kleen et al. |
| 2021/0287551 A1 | 9/2021 | Pedersen |
| 2021/0403039 A1 | 12/2021 | Horigome et al. |
| 2022/0256255 A1 | 8/2022 | Dixit |
| 2022/0363264 A1 | 11/2022 | Bilal et al. |
| 2023/0056390 A1 | 2/2023 | Balasubramanian et al. |
| 2023/0186983 A1 | 6/2023 | Grover et al. |
| 2023/0194899 A1 | 6/2023 | Su et al. |
| 2024/0027760 A1* | 1/2024 | Beckman ............ G02B 27/0101 |

FOREIGN PATENT DOCUMENTS

| | | |
|---|---|---|
| CN | 112566340 A | 3/2021 |
| CN | 113771745 A | 12/2021 |
| CN | 114132328 A | 3/2022 |
| CN | 115363529 A | 11/2022 |
| DE | 102013002875 A1 | 9/2014 |
| DE | 102017219535 A1 | 5/2019 |
| DE | 102021105077 A1 | 9/2022 |

* cited by examiner

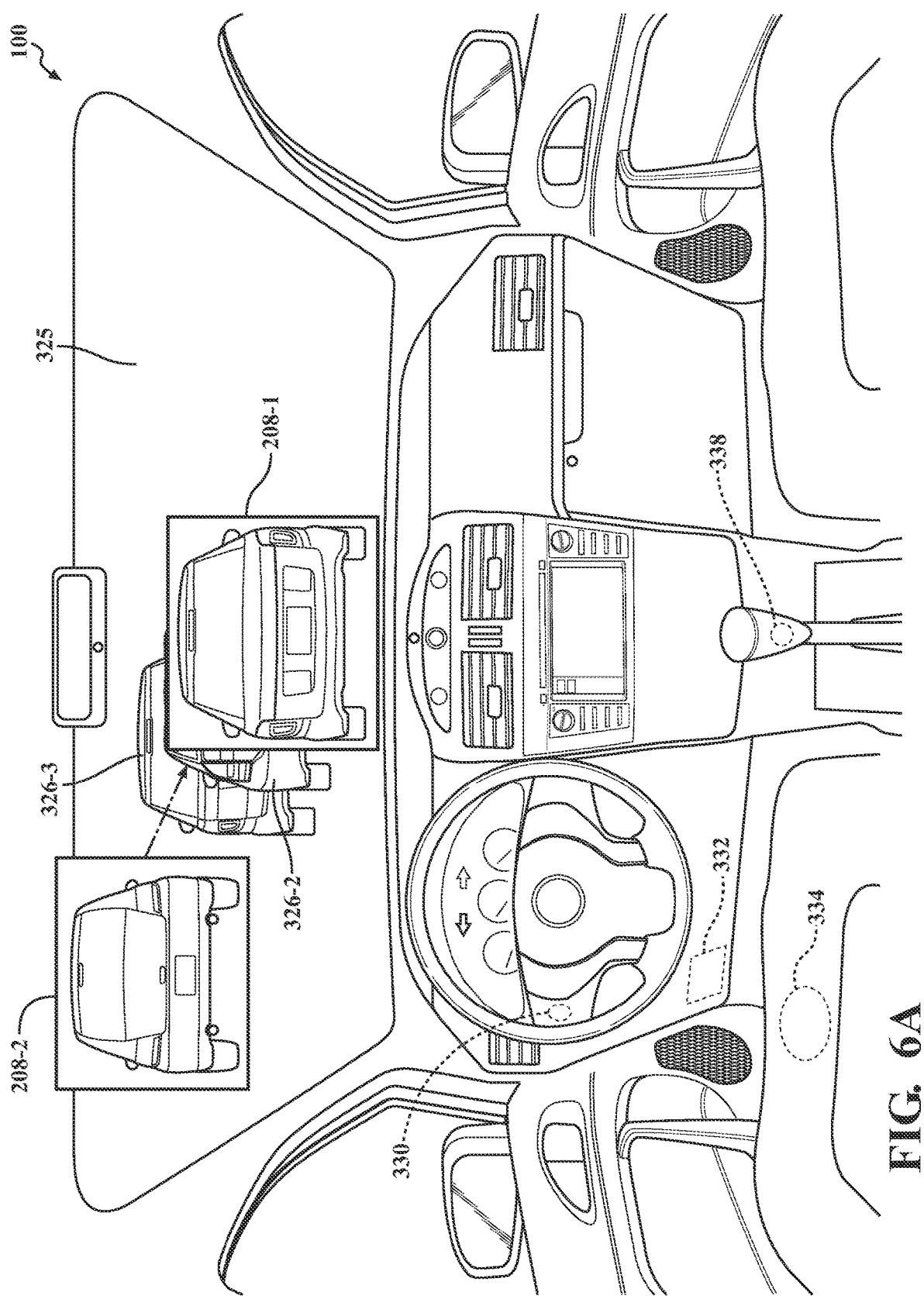

SYSTEMS AND METHODS FOR SUPERIMPOSING AUGMENTED REALITY VEHICLE LIGHTS IN A VEHICLE DISPLAY

CROSS-REFERENCE TO RELATED APPLICATIONS

This application claims benefit of U.S. Non-Provisional application Ser. No. 18/526,111, filed on Dec. 1, 2023, which is herein incorporated by reference in its entirety.

TECHNICAL FIELD

The subject matter described herein relates, in general, to reducing the sensory load of a vehicle driver and, more particularly, to detecting vehicle driver sensory overload and presenting synchronized computer-generated representations of exterior vehicle lights of nearby vehicles through an augmented reality (AR) display device of a vehicle to reduce the sensory load of the vehicle driver.

BACKGROUND

Vehicle roads and the adjacent infrastructure (e.g., sidewalks, crosswalks, etc.) are becoming increasingly complex and populated with vehicles and pedestrians. This is most apparent in urban areas with significant population and vehicle densities. Given 1) the proximity of vehicles to other vehicles and pedestrians, 2) the speeds of vehicles, 3) the physical dimensions of vehicles, and 4) the quantity of vehicles and pedestrians utilizing the roads and adjacent infrastructure, there is an inherent risk in these environments for accidents, collisions, or other undesirable circumstances. Infrastructure elements such as traffic lights, traffic signs, and crosswalks may be installed in these environments to ensure the safety of vehicles and pedestrians alike. However, the safety of road users relies on the constant vigilance, focus, and attention of vehicle drivers and pedestrians alike.

SUMMARY

In one embodiment, example systems and methods relate to a manner of improving vehicle driver perception of an environment surrounding a vehicle.

In one embodiment, an augmented reality (AR) synchronization system for synchronizing the presentation of exterior vehicle lights to a vehicle driver to reduce the sensory overload of the vehicle driver is disclosed. The AR synchronization system includes one or more processors and a memory communicably coupled to the one or more processors. The memory stores instructions that, when executed by the one or more processors, cause the one or more processors to assess a sensory environment of a vehicle driver. The memory also stores instructions that, when executed by the one or more processors, cause the one or more processors to determine that the vehicle driver is in a sensory-overloaded state based on 1) a characteristic of the sensory environment, 2) physiological sensor data for the vehicle driver, and 3) driving behavior sensor data. The memory also stores instructions that, when executed by the one or more processors, cause the one or more processors to superimpose an AR overlay of computer-generated synchronized exterior vehicle lights over asynchronous real-world exterior vehicle lights viewed through an AR display device of a vehicle based on a determination that the vehicle driver is in the sensory-overloaded state.

In one embodiment, a non-transitory computer-readable medium for synchronizing the presentation of exterior vehicle lights to a vehicle driver to reduce the sensory overload of the vehicle driver and including instructions that, when executed by one or more processors, cause the one or more processors to perform one or more functions is disclosed. The instructions include instructions to assess a sensory environment of a vehicle driver. The instructions also include instructions to determine that the vehicle driver is in a sensory-overloaded state based on 1) a characteristic of the sensory environment, 2) physiological sensor data for the vehicle driver, and 3) driving behavior sensor data. The instructions also include instructions to superimpose an AR overlay of computer-generated synchronized exterior vehicle lights over asynchronous real-world exterior vehicle lights viewed through an AR display device of a vehicle based on a determination that the vehicle driver is in the sensory-overloaded state.

In one embodiment, a method for synchronizing the presentation of exterior vehicle lights to a vehicle driver to reduce the sensory overload of the vehicle driver is disclosed. In one embodiment, the method includes assessing a sensory environment of a vehicle driver. The method also includes determining that the vehicle driver is in a sensory-overloaded state based on 1) a characteristic of the sensory environment, 2) physiological sensor data for the vehicle driver, and 3) driving behavior sensor data. The method also includes superimposing an AR overlay of computer-generated synchronized exterior vehicle lights over asynchronous real-world exterior vehicle lights viewed through an AR display device of a vehicle based on a determination that the vehicle driver is in the sensory-overloaded state.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 6A and 6B illustrate one embodiment of the AR synchronization system generating an AR overlay of synchronized exterior vehicle lights to reduce the sensory load of a vehicle driver.

DETAILED DESCRIPTION

Figure 1:
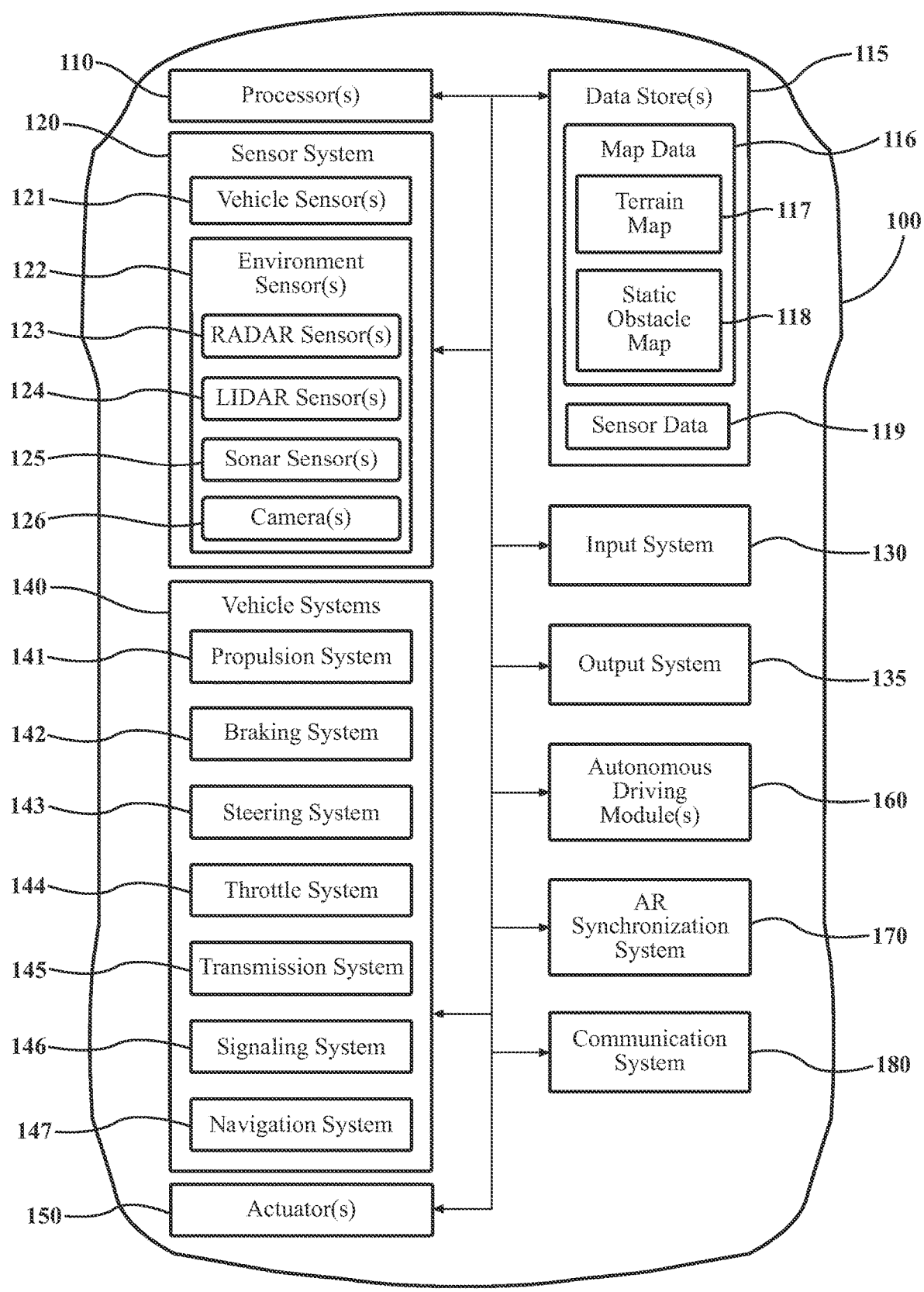
FIG. 1 illustrates one embodiment of a vehicle within which systems and methods disclosed herein may be implemented.

Systems, methods, and other embodiments associated with improving safety on potentially busy roads by altering the presentation of exterior vehicle lights to reduce the sensory load of a vehicle driver are disclosed herein. As previously described, vehicular travel, while a daily occurrence for many individuals, can pose a risk to road users (e.g., pedestrians, motorists, cyclists, etc.). Some infrastructure elements (e.g., traffic signs, lane markings, pedestrian crossing signals) and vehicle features (e.g., turn lamps) promote the safe navigation of roads by vehicles and pedestrians alike. Even with these safety measures, road navigation can be dangerous. As such, motorists and pedestrians should exercise constant vigilance and attention while traveling along roads.

However, some conditions may negatively impact the amount of vigilance and focus a vehicle driver can give to the environment and thus increase the likelihood of a potentially dangerous situation. Road environments, especially in urban areas, have generous amounts of light and sounds that can overload the sensory system of a vehicle driver. For example, buildings, vehicles, pedestrians, infrastructure, and ambient conditions represent stimuli that contribute to the sensory environment of the vehicle driver. These and other environmental sensory stimuli may abound and overwhelm a vehicle driver's senses. As one particular example, vehicles may include turn signals that flash to indicate an intent to turn. A row of vehicles intending to turn may appropriately activate their turn signals. However, the turn signals of the row of vehicles may be asynchronous. That is, the turn signals may flash at different rates, have different hues, and be differently sized. The variation in rate, hue, and/or size of turn signals may increase the overall sensory stimulus to a level where a vehicle driver experiences reduced cognitive functionality. This is exacerbated by any audible noises associated with the nearby vehicle turn signals and the noise associated with the turn signal indicator of the ego vehicle.

To provide context, cerebral blood is a limited resource. At any given moment for any given task, blood is distributed or allocated to the brain regions that support that task. Sometimes, however, perceptual overload can lead to a misallocation of the proportion of blood flow such that when a brain region is perceptually overloaded (e.g., the visual cortex is overloaded due to many flashing lights in the environment), the overloaded region may receive a disproportionately large volume of blood flow, leaving other brain regions deprived of the necessary blood flow that facilitate the successful completion of a task. That is, sensory overload may have the physiological effect of directing blood flow away from portions of the brain, such as the prefrontal cortex, that provide the executive functions used to control a vehicle towards other parts of the brain, such as the occipital cortex, that support the prefrontal cortex but lack the high order executive functions that make it possible to control a vehicle. As such, drivers with a sensory overload may face challenges navigating roads. Example challenges include difficulty identifying relevant visual cues, decreased situational awareness, and slower reaction times. As such, sensory overload may make it harder for drivers to assess the environment and prioritize and react to potential hazards in the environment. This overwhelm and/or confusion may impact driver perception, performance, and decision-making ability. Other issues may also arise based on the impaired state that results from the sensory overload of the driver.

Accordingly, the augmented reality (AR) synchronization system of the present specification identifies when a vehicle driver is experiencing sensory overload and takes action to reduce the sensory overload by reducing the visual/audible distraction that is caused by asynchronous turn signals. That is, the AR synchronization system synchronizes the presentation of exterior vehicle lights of surrounding vehicles. In an example, such synchronization may include overlaying computer-generated representations of synchronized vehicle lights on top of real-world vehicle lights as viewed through an AR display device (e.g., a heads-up display (HUD)).

In one approach, the AR synchronization system may determine when the driver is overwhelmed based on 1) physiological sensor data retrieved from biometric sensors and in-vehicle driver monitoring sensors and 2) the reactions/performance of the driver. The AR synchronization system also considers the sensory environment in determining the sensory state of the driver. For example, the AR synchronization system may generate the AR overlay when the environment is stimulating/overwhelming (e.g., when there are many blinking billboards, many vehicles, construction zones, etc.).

In any case, when the driver is in a sensory-overloaded state and a stimulating environment, the AR synchronization system may manipulate the AR display device (e.g., HUD) of the vehicle to reduce the sensory load. Specifically, the AR synchronization system may manipulate the AR display device to overlay synchronized turn signals (e.g., turn signals with uniform blink rates, brightness, colors, shapes, etc.) onto the surrounding vehicles visible through the windshield.

In this way, the disclosed systems, methods, and other embodiments improve pedestrian and vehicle safety on roads and adjacent infrastructure by reducing the sensory load of vehicle drivers. This is done by synchronizing the presentation of exterior vehicle lights, such as turn signals, to eliminate one source of sensory overload that may arise from the asynchronous blinking of turn signals of multiple vehicles on the road.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes sensors to perceive aspects of the surrounding environment, and thus benefits from the functionality discussed herein associated with reducing the sensory load of a vehicle driver via the synchronized presentation of surrounding exterior vehicle lights (e.g., turn signals, headlights, light bars, etc.)

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes an AR synchronization system 170 that is implemented to perform methods and other functions as disclosed herein relating to improving road safety by reducing the sensory overload of vehicle drivers.

As will be discussed in greater detail subsequently, the AR synchronization system 170, in various embodiments, may be implemented 1) within the vehicle 100, 2) as a cloud-based service, or 3) partially within the vehicle 100 and as a cloud-based service. For example, in one approach, functionality associated with at least one module of the AR synchronization system 170 is implemented within the vehicle 100, while further functionality is implemented within a cloud-based computing system. Thus, the AR synchronization system 170 may include a local instance at the vehicle 100 and a remote instance that functions within the cloud-based environment.

Moreover, the AR synchronization system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, dedicated short-range communication (DSRC), vehicle-to-infrastructure (V2I), vehicle-to-vehicle (V2V), vehicle-to-pedestrian (V2P), vehicle-to-everything (V2X), or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the AR synchronization system 170 can leverage various wireless communication technologies to provide communications to other entities, such as members of the cloud-computing environment.

Figure 2:
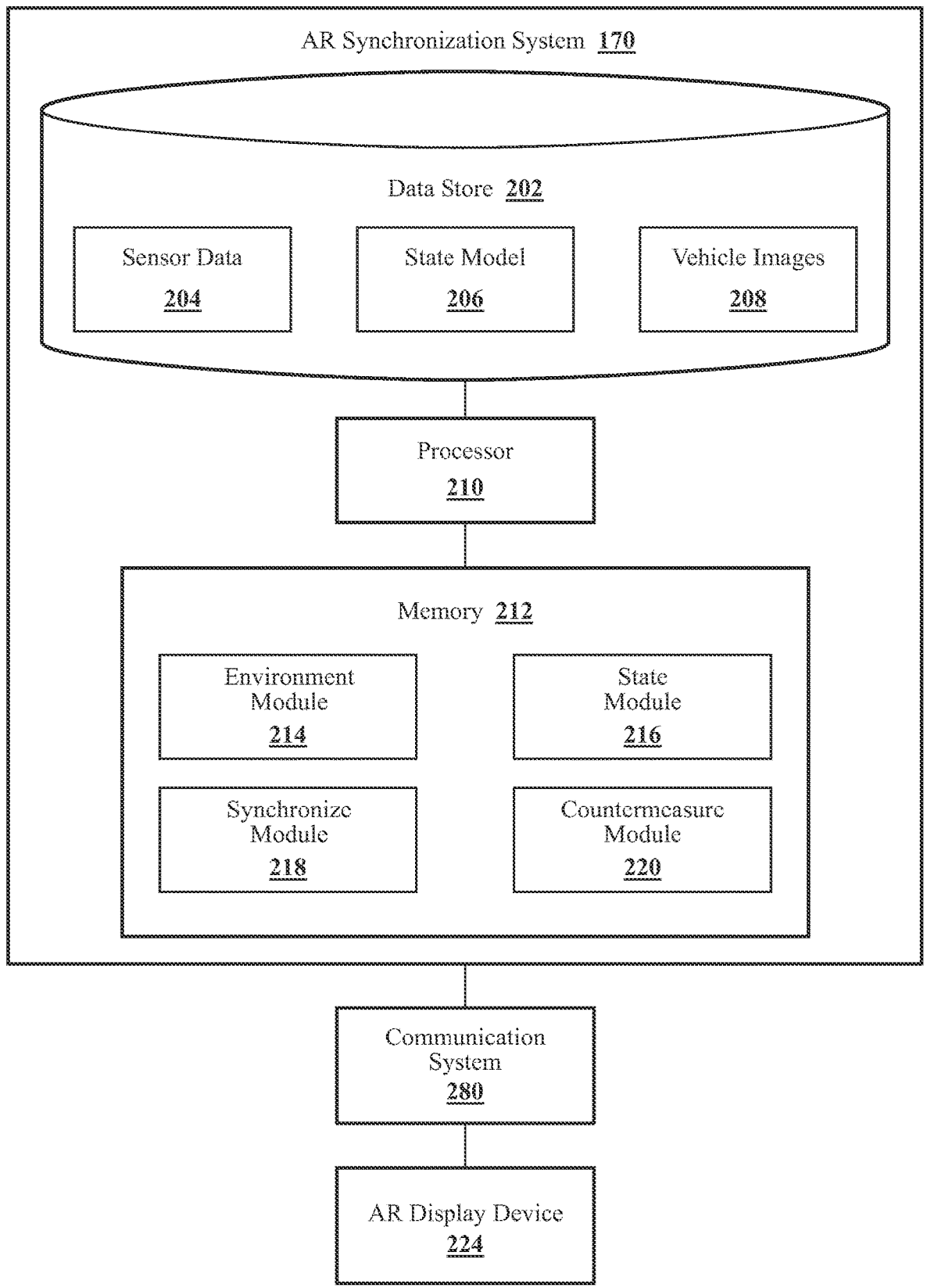
FIG. 2 illustrates one embodiment of an augmented reality (AR) synchronization system that is associated with synchronizing the presentation of exterior vehicle lights of nearby vehicles in an ego vehicle display.
Figure 8:
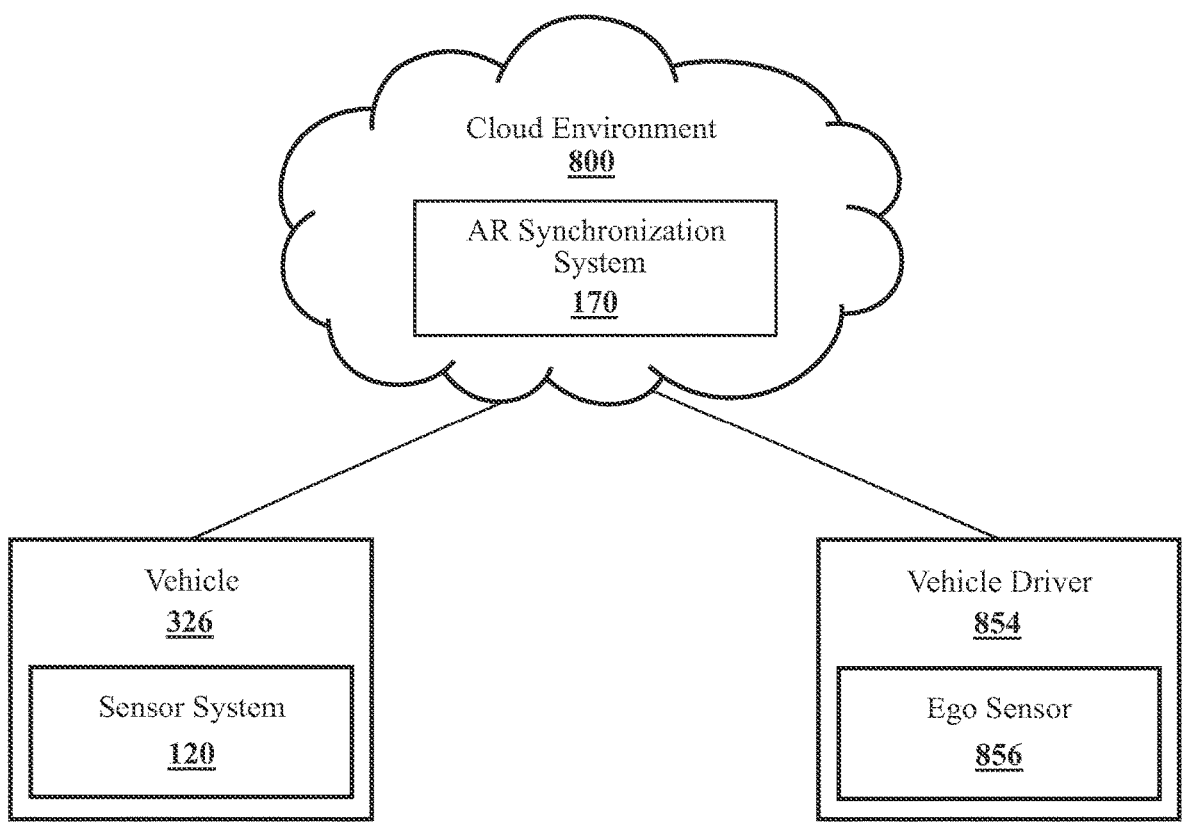
FIG. 8 illustrates one embodiment of the AR synchronization system of FIG. 2 in a cloud-computing environment.

With reference to FIG. 2, one embodiment of the AR synchronization system 170 of FIG. 1 is further illustrated. In an example, the AR synchronization system 170 may be implemented on the vehicle 100, as depicted in FIG. 1. In another example, the AR synchronization system 170 is implemented on a computing device that is remote from the vehicle 100, as depicted in FIG. 8.

In either case, the AR synchronization system 170 is shown as including a processor 210. In the example where the AR synchronization system 170 is part of the vehicle 100, the processor 210 may be a part of the AR synchronization system 170, the AR synchronization system 170 may include a separate processor from the processor 110 of the vehicle 100, or the AR synchronization system 170 may access the processor 110 through a data bus or another communication path that is separate from the vehicle 100.

In one embodiment, the AR synchronization system 170 includes a memory 212 that stores an environment module 214, a state module 216, a synchronize module 218, and a countermeasure module 220. The memory 212 is a random-access memory (RAM), read-only memory (ROM), a hard-disk drive, a flash memory, or another suitable memory for storing the modules 214, 216, 218, and 220. The modules 214, 216, 218, and 220 are, for example, computer-readable instructions that, when executed by the processor 210, cause the processor 210 to perform the various functions disclosed herein. In alternative arrangements, the modules 214, 216, 218, and 220 are independent elements from the memory 212 that are, for example, comprised of hardware elements. Thus, the modules 214, 216, 218, and 220 are alternatively an application-specific integrated circuits (ASICs), hardware-based controllers, a composition of logic gates, or another hardware-based solution.

Moreover, in one embodiment, the AR synchronization system 170 includes the data store 202. The data store 202 is, in one embodiment, an electronic data structure stored in the memory 212 or another data storage device and that is configured with routines that can be executed by the processor 210 for analyzing stored data, providing stored data, organizing stored data, and so on. Thus, in one embodiment, the data store 202 stores data used by the modules 214, 216, 218, and 220 in executing various functions.

The data store 202 includes sensor data 204. In general, the sensor data 204 includes any data collected by the various sensors described herein. Specifically, the sensor data 204 may include 1) physiological sensor data for the vehicle driver, 2) data that is indicative of the sensory environment of the vehicle driver, and 3) driving behavior sensor data. The state module 216 relies on this sensor data 204 to classify the vehicle driver as in a sensory-overloaded state.

As described, the sensor data 204 may include physiological sensor data, which indicates a physiological characteristic or behavior of the driver. For example, a vehicle driver experiencing sensory overload may have an elevated heart rate, an elevated galvanic skin response (GSR), and dilated pupils. Physiological behaviors may also indicate the sensory state of the vehicle driver. For example, certain facial movements (e.g., clenched jaw) and eye movements (e.g., rapid and aperiodic changes in gaze direction towards different objects) may indicate that the sensory environment overloads the vehicle driver. As such, the sensor data 204 may include data collected from any physiological sensor, including in-cabin sensors and ego sensors of the vehicle driver. Examples of physiological sensor data include, but are not limited to, heart rate data, GSR data, brain electrical activity data (as measured by an electroencephalogram (EEG)), near-infrared spectroscopy (NIRS) data, and camera images. While particular reference is made to particular physiological sensor data, the sensor data 204 may include other physiological sensor data.

The sensor data 204 may include environment sensor 122 data. In some examples, the vehicle driver may exhibit behaviors not caused by sensory overload. For example, a vehicle driver may have an increased heart rate from a preexisting medical condition. In this case, synchronization of the presentation of exterior lights of surrounding vehicles may not positively affect the sensory state of the vehicle driver. Examples of environment sensor 122 data include camera images and the output of any radar sensor 123, LiDAR sensor 124, and sonar sensor 125 that may be present on the vehicle 100.

The sensor data 204 may also include information indicating the driving behavior of the driver. That is, each driver may exhibit particular tendencies or patterns when operating a vehicle. Pattern deviations may indicate that the vehicle driver is experiencing sensory overload. As a particular example, in a sensory-overloaded state, the driver may use turn signals less frequently and accelerate/brake at quicker rates than when the driver is not overloaded. These tendencies or patterns may be identified based on data from sensors that monitor the propulsion system 141, braking system 142, steering system 143, throttle system 144, transmission system 145, signaling system 146, and navigation system 147, among others of the vehicle 100. Accordingly, the sensor data 204 includes information from vehicle sensors 121 which indicate the conditions of the vehicle 100 and the interaction of the vehicle driver with the vehicle systems 140.

In an example, the sensor data 204 may include historical sensor data of the vehicle driver and/or other drivers. That is, in some examples a determination regarding whether the vehicle driver is sensory overloaded may be based, at least in part, on a deviation of current characteristics/behavior from expected characteristics/behavior. For example, as described above, an elevated heart rate may indicate that a vehicle driver is visually overloaded. In this example, whether or not a current heart rate is elevated is based on baseline heart rate data for the vehicle driver. As another example, whether or not the facial/eye movements of the vehicle driver are abnormal and therefore indicative of sensory overload, may be based on a comparison of the facial/eye movements of the vehicle driver as compared to the facial/eye movements of the vehicle driver or other drivers when not in a sensory overloaded state. As such, the sensor data 204 may include historical data, which forms a baseline against which currently measured sensor data is compared.

In one embodiment, the data store 202 stores the sensor data 204 along with, for example, metadata that characterizes various aspects of the sensor data 204. For example, the metadata can include location coordinates (e.g., longitude and latitude), relative map coordinates or tile identifiers, time/date stamps from when the separate data was generated, and so on. As a particular example, the metadata may include identifying information about the vehicle driver to which it is associated.

The data store 202 further includes a state model 206, which may be relied on by the state module 216 to classify the sensory state of the vehicle driver. In an example, the AR synchronization system 170 may be a machine-learning system that identifies patterns and/or deviations based on previously unseen data. In the context of the present application, a machine-learning AR synchronization system 170 relies on some form of machine learning, whether supervised, unsupervised, reinforcement, or any other type, to infer whether the vehicle driver is experiencing sensory overload based on the observed characteristics of the vehicle driver (i.e., biometric data, images, and/or driving behavior data) and the observed environmental characteristics. In any case, the state model 206 includes the weights (including trainable and non-trainable), biases, variables, offset values, algorithms, parameters, and other elements that operate to output a likely sensory state of the vehicle driver based on any number of input values including sensor data 204 and environment data. Additional details regarding the operation of a machine-learning state model 206 are provided below in connection with FIG. 8.

In an example, the data store 202 further includes vehicle images 208. As described above and in greater detail below in connection with FIGS. 5-6B, synchronizing the presentation of exterior vehicle lights may include overlaying vehicle images 208 of a vehicle on top of a real-world vehicle as viewed through an AR display device 224. In an example, the overlaid vehicle image 208 may block out the real-world exterior vehicle lights, allowing a superimposition of synchronously choreographed digital exterior vehicle lights. The vehicle images 208 may include images of various makes, models, and colors of vehicles. Accordingly, the AR synchronization system 170 may include a library of vehicle images 208 of any vehicles a vehicle driver may encounter on the road regardless of the make, model, year, and color of the vehicle. The vehicle images 208 may include 360-degree images of the vehicles or images that collectively capture the vehicles in 360 degrees such that regardless of the perspective of the vehicle driver, an overlay that aligns with the current perspective of the real-world vehicle through the AR display device 224 may be superimposed on top of the real-world vehicle.

The AR synchronization system 170 includes an environment module 214 which, in one embodiment, includes instructions that cause the processor 210 to assess the sensory environment of the vehicle driver. As described above, it may be the case that the sensory environment is not a cause of the compromised state of mind of the vehicle driver. In such a case, synchronizing exterior vehicle lights may not alleviate the condition of the vehicle driver and may, therefore, represent a waste of resources. As such, the environment module 214 evaluates the sensor data 204, and more particularly the images of the external environment, to determine whether the sensory environment is potentially the cause of the state of mind of the vehicle driver. Additional details regarding the assessment of the sensory environment are provided below in connection with FIG. 4.

The AR synchronization system 170 further includes a state module 216 which, in one embodiment, includes instructions that cause the processor 210 to determine that the vehicle driver is in a sensory-overloaded state based on 1) a characteristic of the sensory environment, 2) physiological sensor data for a vehicle driver, which physiological sensor data may include physiological characteristic data (e.g., heart rate, GSR, brain activity, etc.) and physiological movement data (e.g., face, eye, body movement data, etc.), and 3) driving behavior sensor data (e.g., vehicle driver driving profile data and/or utilization of various vehicle systems 140). That is, as described above, certain traits/behaviors of a vehicle driver may indicate that the vehicle driver is sensory overloaded. When a potentially overwhelming sensory environment causes these behaviors, the AR synchronization system 170 may take certain remedial measures to prevent a potentially dangerous situation. Additional detail regarding the assessment of the sensor data 204 associated with a vehicle driver is provided below in connection with FIG. 4.

As such, the state module 216, in some examples relying on machine learning, receives the sensor data 204 and an output of the environment module 214 as input and generates a likelihood that the vehicle driver is sensory overloaded. For example, when the sensor data 204 indicates the vehicle driver is executing those movements indicative of sensory overload, the state module 216 may identify the vehicle driver as in a sensory-overloaded state. Given the relationships between 1) behaviors/traits of the vehicle driver and sensory overload and 2) the sensory overload of the vehicle driver and safety, the state module 216 increases the likelihood of safe navigation of busy roads and adjacent infrastructure by reducing the sensory stimulus of the vehicle driver by synchronizing the presentation of exterior vehicle lights.

It should be appreciated that the state module 216, in combination with the state model 206, can form a computational model such as a neural network model. In any case, the state module 216, when implemented with a neural network model or another model in one embodiment, implements functional aspects of the state model 206 while further aspects, such as learned weights, may be stored within the data store 202. Accordingly, the state model 206 is generally integrated with the state module 216 as a cohesive, functional structure. Additional details regarding the machine-learning operation of state module 216 and state model 206 are provided below in connection with FIG. 7.

The AR synchronization system 170 further includes a synchronize module 218 which, in one embodiment, includes instructions that cause the processor 210 to superimpose an AR overlay of computer-generated synchronized exterior vehicle lights over asynchronous real-world exterior vehicle lights viewed through an AR display device of the vehicle 100. As described above, sensory overload may impede the ability of a vehicle driver to correctly perceive and act within a particular environment. As such, the synchronize module 218 may reduce the sensory overload by removing one cause of sensory overload, the asynchronous blinking of exterior vehicle lights. This may be done by overlaying computer-generated choreographed exterior vehicle lights over real-world counterparts viewable through the AR display device 224. An example of a digital overlay of synchronized exterior vehicle lights is provided below in connection with FIGS. 5-6B.

In some examples, the AR synchronization system 170 further includes a countermeasure module 220 which, in one embodiment, includes instructions that cause the processor 210 to produce an additional countermeasure responsive to a vehicle driver identified as being in a sensory overloaded state.

That is, in addition to synchronizing the exterior vehicle lights of surrounding vehicles, the AR synchronization system 170 may notify other entities near the vehicle 100. For example, the countermeasure module 220 may generate a notification to a human vehicle operator, an autonomous vehicle system, or an infrastructure element in the vicinity of the vehicle driver. These notifications may notify of the presence of the sensory overloaded vehicle driver so specific remedial actions can be administered to protect the vehicle driver and others in the vicinity of the vehicle driver.

As described above, the countermeasure may be a command signal transmitted to a nearby vehicle. The command signal changes the operation of the nearby vehicle responsive to an identified vehicle driver with sensory overload. Examples of operational changes triggered by the command signal include, but are not limited to 1) decreasing the vehicle speed, 2) increasing a volume of vehicle horns, 3) modifying a braking profile of an automated vehicle to be softer (i.e., brake sooner and more slowly), 4) modifying an acceleration profile of an automated vehicle to be softer (i.e., accelerate more slowly and over a longer distance), 5) allowing for extra space between the nearby vehicle and the vehicle 100, 6) rerouting the nearby vehicle to avoid being in the vicinity of the vehicle 100, 7) increasing a clearance sonar sensitivity in the presence of the vehicle 100, 8) turning off lane departure alerts in the vicinity of the vehicle 100, 9) increasing adaptive cruise control distance setting to allow for more space between vehicles, 10) flashing lights at the vehicle driver to catch the attention of the vehicle driver, 11) turning down music in the nearby vehicle, 12) applying external one-way blackout to windows to prevent the vehicle driver from seeing inside the nearby vehicle thus simplifying the visual load on the vehicle driver, 13) turning off non-safety related lights and or sounds in the nearby vehicle to reduce the sensory load of the vehicle driver, 14) rolling up windows to block out nearby vehicle cabin noise from further distracting/stressing the vehicle driver, and 15) increasing a frequency of audible alerts or increase conspicuity of signals to increase chance of vehicle driver perception.

Moreover, as described above, the countermeasure may be a command signal transmitted to an infrastructure element, such as a traffic light. Examples of operational changes triggered by the command signal include 1) repeating alerts or increasing the conspicuity of signals to increase the chance of vehicle driver perception, 2) altering signals to reroute traffic away from the vehicle 100, and 3) turning off traffic signals when no vehicles exist within a defined proximity. While particular reference is made to particular countermeasures, various countermeasures may be implemented to reduce or preclude the events that may arise due to a vehicle driver's overloaded sensory state.

In the example where the AR synchronization system 170 is disposed on the vehicle 100 as depicted in FIG. 1, the communication system 280 depicted in FIG. 2, may be an example of the communication system 180 depicted in FIG. 1. In the example where the AR synchronization system 170 is disposed on a remote computing device, the communication system 280 may establish a wireless connection (e.g., Wi-FI® or other wireless communication connection) with the AR display device 224, for example via the communication system 180 of the vehicle 100.

As such, the present AR synchronization system 170 identifies those vehicle drivers experiencing sensory overload and takes remedial measures to avoid the negative situations that may arise where such vehicle drivers are allowed to remain sensory overloaded. Specifically, an AR representation may block out the asynchronous lights of real-world vehicles viewed through an AR display device 224 of the vehicle and superimpose computer-generated and synchronized vehicle lights on top of the asynchronous lights.

Figure 3:
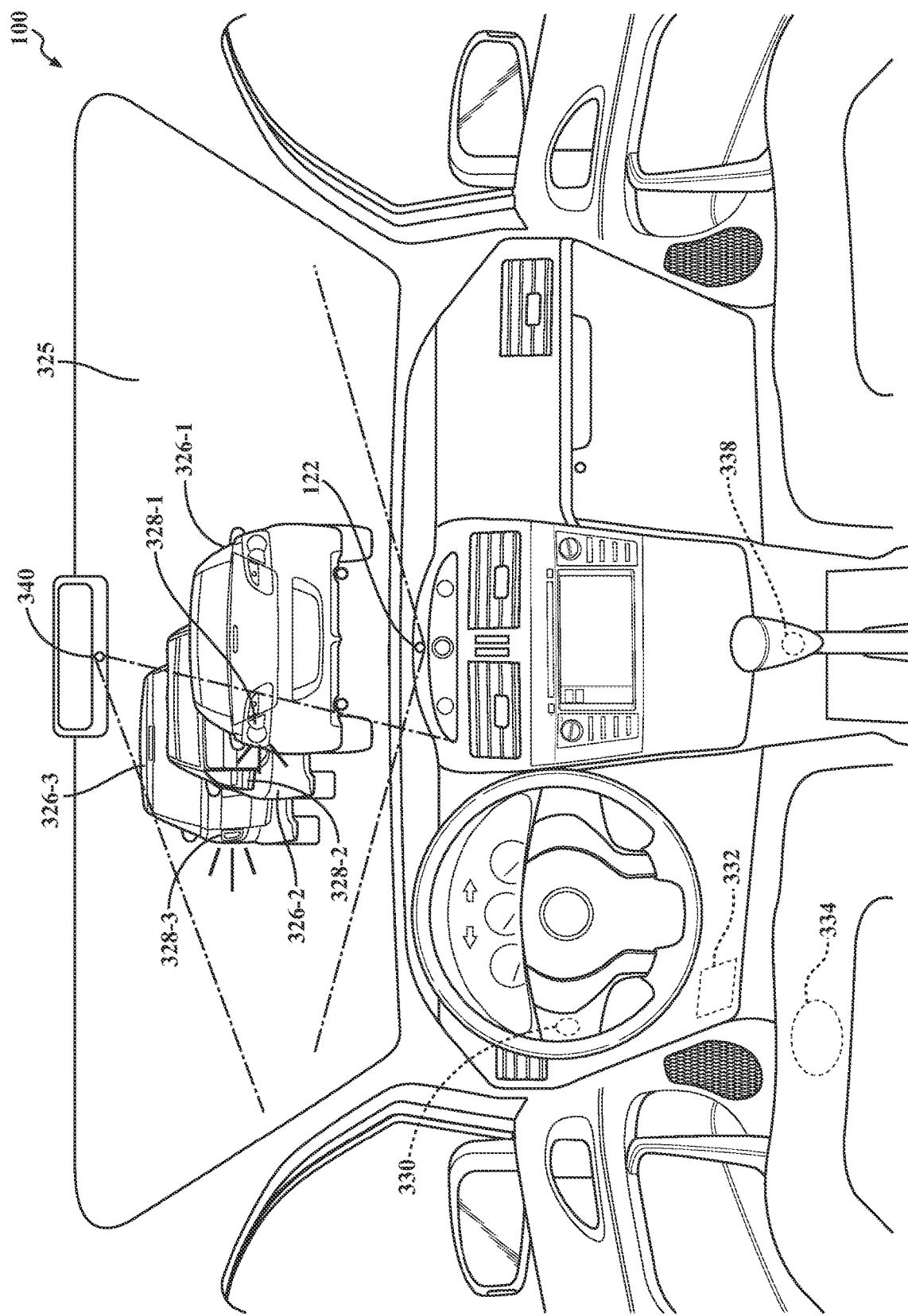
FIG. 3 illustrates asynchronous exterior vehicle lights of nearby vehicles as viewed through an ego vehicle windshield.

FIG. 3 illustrates asynchronous exterior vehicle lights of neighboring vehicles 326-1, 326-2, and 326-3 as viewed through an ego vehicle 100 windshield 325. As described above, the sensory environment of a vehicle driver may result in sensory overload for the vehicle driver, which could compromise the safety of the vehicle driver and other individuals (e.g., pedestrians, cyclists, motorists) in the vicinity of the vehicle driver. Notably, the asynchronous flashing turn signals 328-1, 328-2, and 328-3 may add to the potentially already overwhelming sensory stimulus of the environment. As such, the present AR synchronization system 170 eliminates this source of sensory overload to help ensure the safety of the road for all users.

As described above, the AR synchronization system 170 receives data from various sensors. For example, the vehicle 100 may include one or more environment sensor(s) 122 that sense objects, such as visual stimuli sources in the surrounding environment of the vehicle 100. The environment sensor(s) 122 may have a field of view in front of the vehicle 100. As an example, in one or more arrangements, the environment sensor(s) 122 may include one or more radar sensors, one or more LiDAR sensors, one or more sonar sensors (e.g., ultrasonic sensors), and/or one or more cameras (e.g., monocular, stereoscopic, RGB, infrared, etc.). As such, the AR synchronization system 170 includes instructions that cause the processor 210 to assess environment sensor 122 data, which indicates the surrounding environment of the vehicle 100. Specifically, via the environment sensor(s) 122, the environment module 214 assesses the external sensory environment of the vehicle driver.

The environment module 214 also assesses the in-cabin sensory environment of the vehicle driver. That is, in addition to externally-based stimulus, a vehicle driver may be distracted or otherwise cognitively compromised by sensory stimuli within the vehicle 100, such as from other passengers in the vehicle 100 and the visual and audible environment within the vehicle 100. As such, the vehicle 100 may include various sensors such as in-cabin cameras 340 and microphones that collect data from which the in-cabin sensory environment of the vehicle driver may be assessed and evaluated to determine whether or not such is a likely cause of the current overload state of the vehicle driver.

The in-cabin camera 340 may also capture physiological behavior data for the vehicle driver, which may be relied on to determine the vehicle driver sensory state. That is, certain physical characteristics and movements may be indicative of sensory overload. Examples include perspiration, pupil dilation, facial movement/contortion, and eye movement. As such, vehicle 100 may include a driver-facing in-cabin camera 340 to capture the physiological characteristics and behaviors that may indicate sensory overload.

As another example, the vehicle driver state may be determined from biometric data collected from various devices. For example, a vehicle driver may be carrying or wearing a biometric sensor that monitors the heart rate, the GSR, or the brain activity of a vehicle driver. In an example, the biometric sensor may be a health monitoring device worn by a vehicle driver (e.g., a smartwatch). In another example, the biometric sensor may be disposed on a user device (e.g., a smartphone) carried by the vehicle driver. In these examples, the AR synchronization system 170 may establish a wireless connection (e.g., Bluetooth® or Wi-Fi) with the device from which the biometric data is collected. While particular reference is made to particular biometric sensors, the biometric sensor may be any sensor that collects biometric information from the vehicle driver. As such, the AR synchronization system 170 includes instructions that cause the processor 210 to assess at least one of the biometric data for the vehicle driver or images of the vehicle driver to determine that the vehicle driver is in the sensory-overloaded state.

As described above, the sensory state of the vehicle driver may be determined, at least in part, based on the interaction of the vehicle driver with various vehicle systems 140. For example, the grip of the vehicle driver on the steering wheel may indicate the vehicle driver state. Specifically, a firmer grip may indicate nervousness or stress, which the sensory environment may induce. As another example, the grip force, or frequency of use, of a shift knob may also indicate the vehicle driver state. As yet another example, a vehicle driver who is fidgety in their seat may be agitated or otherwise cognitively compromised due to the sensory stimulus of an environment. As yet another example, the vehicle driver use of specific control systems such as the propulsion system 141, the braking system 142, the steering system 143, the throttle system 144, and the transmission system 145 may indicate the state of mind of the vehicle driver.

As such, the vehicle 100 may be equipped with certain in-vehicle sensors such as a steering wheel sensor 330, a shift knob sensor 338, a seat sensor 334, and a sensor system 332 which monitors any of the vehicle systems 140 described in FIG. 1. As such, the state module 216 includes instructions that cause the processor 210 to assess the sensor data indicative of a driver interaction with a vehicle system 140. While particular reference is made to particular in-vehicle sensors, the vehicle 100 may include any number of other sensors, the output of which may be stored as sensor data 204 and relied on by the state module 216 to determine the sensory state of the vehicle driver.

As described above, the asynchronous blinking of exterior lights, such as turn signals 328, may cause a vehicle driver to experience sensory overload. This situation is exacerbated, considering vehicle lights may have different hues and sizes. In this example, the AR synchronization system 170 synchronizes at least one of the flashing rates, color, and size of the exterior vehicle lights as viewed through a transparent surface (e.g., the windshield 325) of the AR display device 224. As such, the synchronize module 218 may include instructions that cause the processor 210 to synchronize at least one of 1) a light flashing rate, a light flashing timing, a light color, a light shape, a light position, or a light movement. With regards to light movement, it may be that the turn signals 328 include multiple light-emitting diodes (LEDs) that may be illuminated in a sequence (e.g., left to right, right to left, up to down, down to up, circular movement, and spiral movement). In this example, the synchronize module 218 may generate an LED movement pattern for each vehicle 326 that is synchronized with the LED movements of turn signals 328 of other vehicles 326.

In general, the AR display device 224 projects digital objects onto a transparent surface, such as a windshield 325. The content may be aligned with the vehicle driver's view and superimposed over real-world content viewed through the windshield 325. In the context of the present disclosure, the digital objects are synchronized exterior vehicle lights superimposed on top of the real-world exterior vehicle lights viewed through the windshield 325 of the vehicle 100.

The AR display device 224 may use different projection modalities. In one example, to enable the digital projection of content onto the windshield 325, an AR display device 224 may include various components, such as a combiner/display, cameras, sensors, processors (such as central processing units (CPUs), graphics processing units (GPUs)), memory, and wireless transceivers. A front-facing camera or other environment sensor 122 may perceive the environment in front of the vehicle 100. Processors in the AR display device 224 may process the captured data and identify anchors within the real-world scene where digital content is to be overlaid. Anchoring may take various forms, including simultaneous localization and mapping (SLAM), marker-based anchoring, and location-based anchoring. Once the location of the digital projections is identified via the anchors, the digital content is retrieved from the AR synchronization system 170. A projector (e.g., in the dashboard) presents the digital content in a suitable location (e.g., over the real-world exterior vehicle lights) as determined by the anchor points within the field of view of the vehicle driver.

Figure 4:
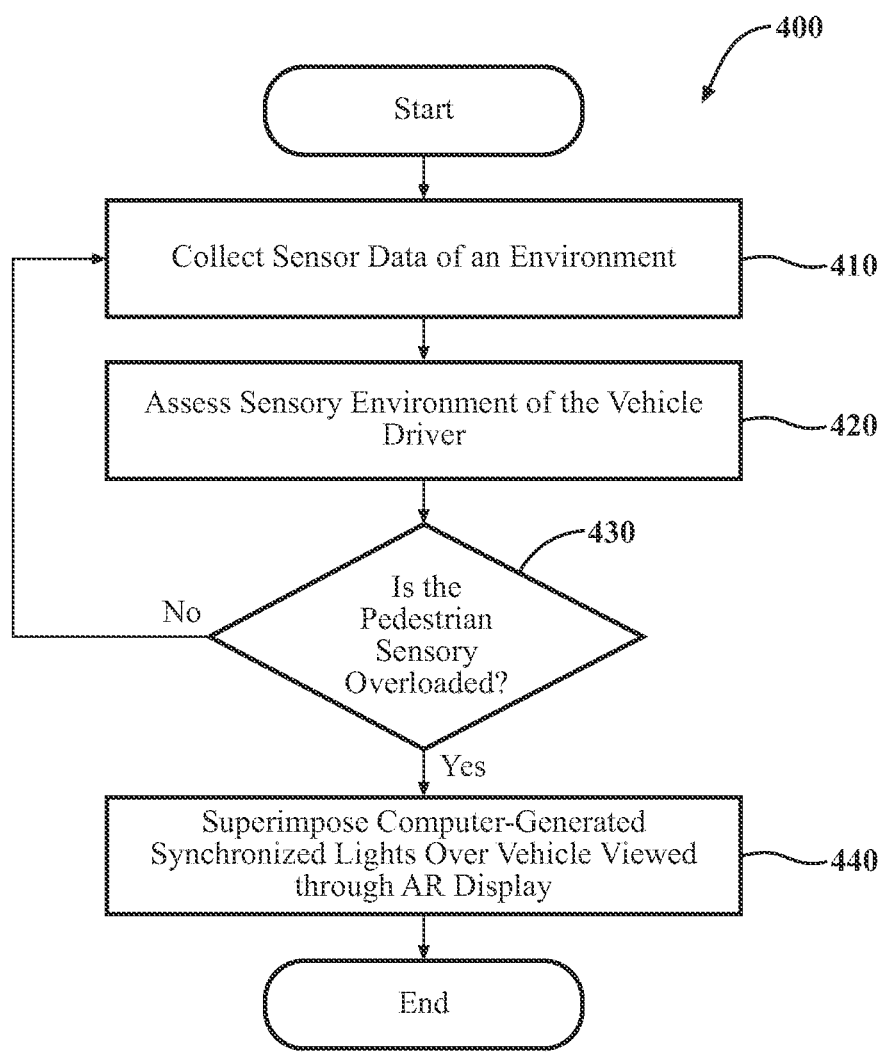
FIG. 4 illustrates a flowchart for one embodiment of a method that is associated with synchronizing the presentation of exterior vehicle lights of nearby vehicles in an ego vehicle display.

Additional aspects of synchronizing the presentation of exterior vehicle lights will be discussed in relation to FIG. 4. FIG. 4 illustrates a flowchart of a method 400 that is associated with synchronizing the presentation of exterior vehicle lights of neighboring vehicles 326. Method 400 will be discussed from the perspective of the AR synchronization system 170 of FIGS. 1 and 2. While method 400 is discussed in combination with the AR synchronization system 170, it should be appreciated that the method 400 is not limited to being implemented within the AR synchronization system 170 but is instead one example of a system that may implement the method 400.

At 410, the AR synchronization system 170 acquires the sensor data 204 from sensors, whether they be onboard physiological sensors (e.g., a driver-facing in-cabin camera 340), onboard environment sensors (e.g., forward-facing cameras, etc.), vehicle system sensors (e.g., steering wheel sensor 330, seat sensor 334, shift knob sensor 338, sensors of the sensor system 332) or remote biometric sensors (e.g., smartwatch sensor, biometric sensor of a user device). In an embodiment, the AR synchronization system 170 controls the sensors to acquire the sensor data 204 at successive iterations or time steps. Thus, the AR synchronization system 170, in one embodiment, iteratively executes the functions discussed at blocks 410-430 to acquire the sensor data 204 and provide information therefrom. Furthermore, the AR synchronization system 170, in one embodiment, executes one or more of the noted functions in parallel for separate observations in order to maintain updated perceptions. Additionally, as previously noted, the AR synchronization system 170, when acquiring data from multiple sensors, fuses the data together to form the sensor data 204 and to provide for improved determinations of detection, location, and so on.

There are many elements of a sensory environment that could potentially overwhelm a vehicle driver. Examples include the number of lights (e.g., exterior vehicle lights and others) in the environment, the brightness of lights, the intensity of the lights, the contrast between the lights and ambient light, the flashing frequency of lights, the color of the lights, the density of lights in the environment, and others. Some environments may be more likely to cause sensory overload in a vehicle driver. For example, many building lights in an urban center with many vehicles at night may be more likely to overstimulate a vehicle driver than a few traffic signs in a rural neighborhood during the day. As such, at 420, the environment module 214 evaluates the sensory environment of the vehicle driver. More specifically, the environment module 214 may include an image processor that processes captured images or other environment sensors 122 to identify various vehicle and environment light sources and the quality and nature of the emanated light from each source. The environment module 214 may then evaluate the sensory environment in any number of ways. For example, the environment module 214 may assign the sensory environment a score based on an assessment of the above-noted criteria. If the score is greater than a threshold, the environment module 214 may deem the sensory environment as one that could lead to sensory overload for the vehicle driver. In an example, the threshold may be set by a user based on personal preference or may be set by a system administrator or engineer based on medical standards. While particular reference is made to one mechanism for assessing the sensory environment, other mechanisms may be implemented with the result of identifying characteristics of the sensory environment and quantifying the characteristics.

At 430, the state module 216 determines whether the vehicle driver is in a sensory overloaded state based on 1) a characteristic of the sensory environment, 2) the physiological sensor data for the vehicle driver, and 3) the driving behavior sensor data. As described above, certain physiological traits, such as an elevated heart rate, an elevated GSR, increased brain activity, and others, may indicate that the vehicle driver is sensory overloaded when combined with a determined overstimulating environment. As such, the state module 216 evaluates the biometric sensor data to determine whether any biometric data for the vehicle driver is above what is expected for the vehicle driver.

Similarly, some physical behaviors of the vehicle driver may indicate that the vehicle driver is sensory overloaded when combined with the determined overstimulating environment. For example, an overstimulated vehicle driver may raise their hand to block visual stimuli, squint their eyes, or turn away from the visual stimuli. As such, the state module 216 may include an image processor that can detect vehicle drivers in images captured by in-cabin cameras 340 and track the traits/movement of the vehicle driver and the different body parts of the vehicle, such as their face, eyes, arms, and legs.

Still further, vehicle driver interactions with the vehicle systems may indicate the driver is sensory overloaded. For example, a driver who grips a steering wheel tight, uncharacteristically changes lanes, or presses the brake and acceleration pedals more aggressively may be sensory overloaded. Additional examples of vehicle driver interactions that may indicate sensory overload include a frequency of lane changes, swerving, signaling (or a lack thereof), speeding, etc. As such, the state module 216 includes instructions that cause the processor 110 to retrieve the vehicle interaction data and analyze such to determine whether the vehicle driver is engaging in any interactions that correlate to sensory overload.

Note that in some examples, the state module 216 relies on various sensor data when generating an output. That is, a single movement, biometric characteristic, or driving behavior may be insufficient to generate a classification with a threshold confidence level. As such, the state module 216, relying on the state model 206, may weigh the different sensor data 204 and environment data to generate a classification with the threshold level of confidence.

In an example, the classifications depend on a deviation of measured sensor data 204 from baseline sensor data, which baseline sensor data may pertain to either the vehicle driver or different vehicle drivers. The baseline sensor data may take various forms and generally reflects the historical patterns of those for whom it is collected. As specific examples, baseline sensor data may include historical biometric data (e.g., baseline heart rate, baseline GSR, baseline brain activity), historical movement patterns, and historical driving behaviors. In this example, the state module 216 identifies historical patterns and deviations of sensor data 204 indicative of the current state of the vehicle driver from the historical data.

For example, the state module 216 may compare historical biometric data for the vehicle driver against current biometric data for the vehicle driver to determine if any changes to biometric data could indicate sensory overload. As another example, the state module 216 may compare the movements of the vehicle driver to historical movements to detect overload-indicating deviations. As a particular example, dilated pupils may indicate that a driver is overstimulated. As yet another example, the state module 216 may consider deviations in driving behaviors as indicated by the sensor data 204. For example, the sensor data 204 may indicate a driver changing lanes at a greater rate and depressing the acceleration and brake pedals with more force than expected for the vehicle driver based on baseline driving behavior data. As such, in this example, the deviation from expected behavior is evidence of sensory overload. Other deviations between baseline driving behavior and currently measured driving behavior that may indicate sensory overload include lateral variation, lateral lane position, acceleration reaction time, and brake reaction time.

The baseline sensor data may be classified based on metadata associating the baseline sensor data with the sensory overladed state of the individuals for whom it is collected. Put another way, the baseline sensor data may include baseline sensor data for the vehicle driver and other users when not overstimulated and baseline sensor data for the vehicle driver and other users when overstimulated in the sensory environment. That is, the vehicle driver and other individuals may exhibit certain patterns when experiencing sensory overload and other patterns when not overstimulated. The state module 216 may identify these patterns in historical baseline sensor data and compare them to currently measured sensor data 204 for vehicle drivers to identify deviations between them.

As such, the state module 216 includes instructions that cause the processor 210 to compare the sensor data 204 with baseline sensor data where the baseline sensor data indicates 1) physiological characteristics/behaviors and driving behavior patterns for the vehicle driver and/or 2) a physiological characteristics/behaviors and driving behavior patterns of a different vehicle driver. By comparing current sensor data 204 against baseline sensor data and considering the output of the environment module 214, the state module 216 can infer the sensory state of the vehicle driver. In other words, the state module 216, which may be a machine-learning module, identifies patterns in the expected behavior of the vehicle driver and/or other users and determines when the current behavior/biometric data deviates or aligns with those patterns. Those deviations and the characteristics of the deviation (e.g., number of deviations, frequency of deviations, degree of deviations) are relied on in determining whether the vehicle driver is likely to be experiencing sensory overload.

Specifically, the state module 216 may classify the vehicle sensory state based on at least one of 1) a degree of deviation between the sensor data 204 and the baseline sensor data and/or 2) a number of deviations between the sensor data 204 and the baseline sensor data within a period. That is, certain deviations from an expected behavior (as indicated by the baseline sensor data) may not indicate sensory overload but may be attributed to natural variation or another cause.

If the state module 216 determines that the vehicle driver is not in a sensory overloaded state, then the AR synchronization system 170 continues monitoring sensor data 204 and environment data. If the vehicle driver is experiencing sensory overload, then at 440, the synchronize module 218 alters the presentation of exterior vehicle lights by superimposing an AR overlay of computer-generated and synchronized exterior vehicle lights on top of real-world exterior vehicle lights as viewed through an AR display device 224 as described below in connection with FIGS. 6A and 6B.

In either case, the present system, methods, and other embodiments promote the safety of all road users by identifying vehicle drivers who are experiencing sensory overload and reducing their sensory overload to promote a safer environment for pedestrians and vehicles.

Figure 5:
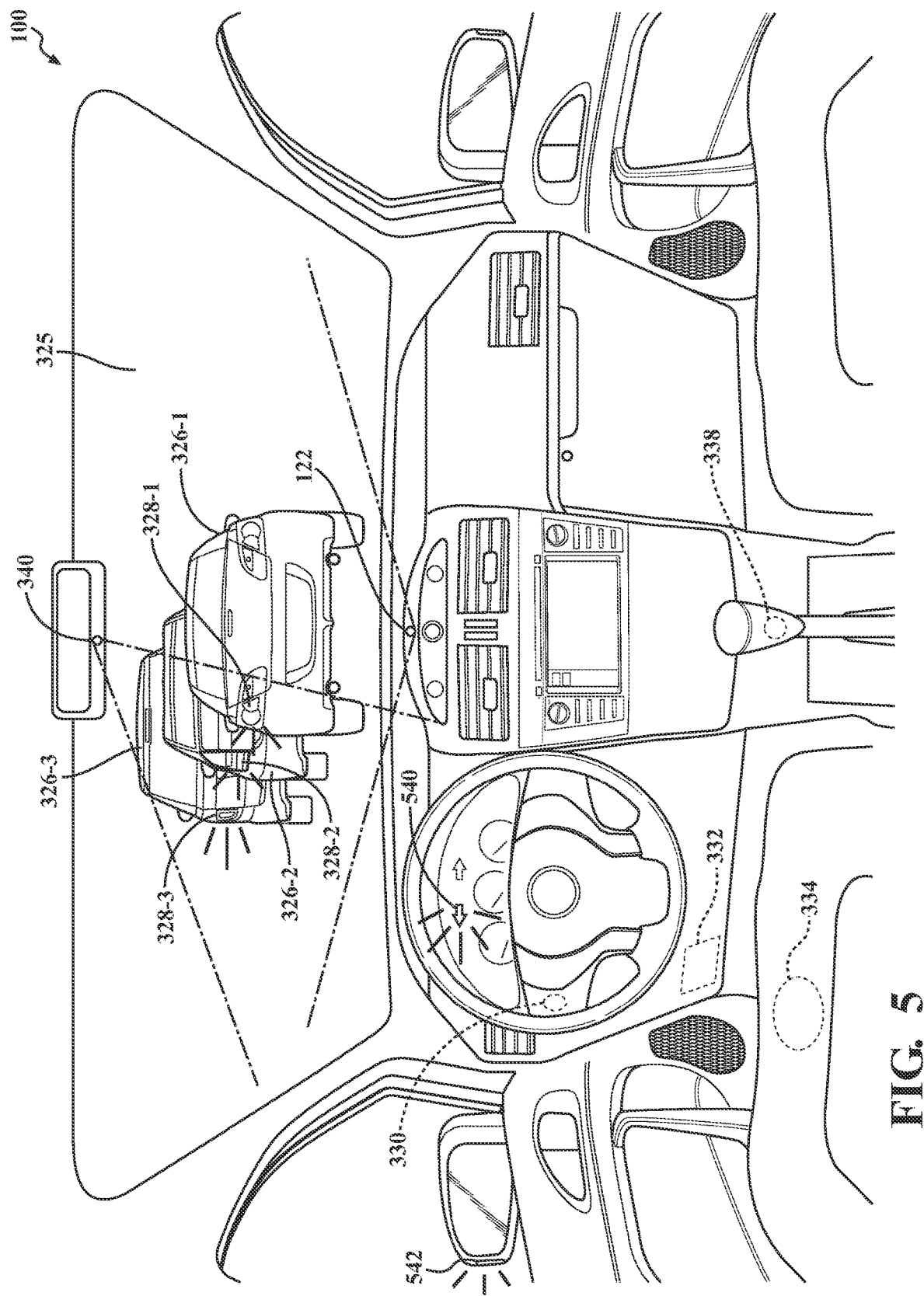
FIG. 5 illustrates synchronous computer-generated light overlays of nearby vehicles in an ego vehicle display.

FIG. 5 illustrates synchronizing the presentation of exterior vehicle lights of neighboring vehicles 326-1, 326-2, and 326-3 in an ego vehicle 100 display. As described above, the asynchronous blinking of exterior vehicle lights, such as turn signals 328-1, 328-2, and 328-3, may cause a vehicle driver to experience sensory overload. This situation is exacerbated considering vehicle lights may have different hues and sizes. In this example, the AR synchronization system 170 synchronizes the presentation of the various exterior vehicle lights. This is done via an AR display device 224, such as a HUD in a windshield 325, as described in more detail in connection with FIGS. 6A and 6B. Following this process, the exterior vehicle lights appear synchronous, as depicted in FIG. 5.

FIG. 5 also depicts additional vehicle 100 components that may be adjusted to reduce sensory load. Specifically, a vehicle 100 may include an in-cabin turn signal indicator 540. As with the exterior vehicle lights, the turn signal indicator 540 flashes at a particular frequency or rate. With each flash, an audible noise may also be generated from the turn signal indicator 540. A turn signal indicator 540 that flashes/sounds asynchronously from the exterior vehicle lamps may overstimulate the vehicle driver. As such, the synchronize module 218 may include instructions that cause the processor 210 to synchronize at least one of a turn signal visual indicator or a turn signal audio indicator with the computer-generated synchronized exterior vehicle lights. Doing so removes another potential source of sensory overload to improve the perception and reactivity of the vehicle driver to the surrounding environment and events occurring therein. As another example, rather than synchronizing the turn signal indicator 540, the synchronize module 218 may include instructions that cause the processor 210 to disable at least one of the turn signal visual indicator or the turn signal audio indicator responsive to the generation of the computer-generated synchronized exterior vehicle lights.

In addition to altering in-cabin turn signal indicators, additional lights of the ego vehicle 100 may be synchronized with the exterior vehicle lights of the neighboring vehicles 326. Specifically, the synchronize module 218 may include instructions that synchronize a turn signal lamp 542 of the ego vehicle 100 with the computer-generated synchronized exterior vehicle lights. As such, the present system promotes reliable, accurate, and safe sensory perception of the environment by reducing specific sources of stimulation that may overload a vehicle driver or otherwise decrease their sensory ability to acknowledge and respond to objects/events in the environment.

Figure 6B:
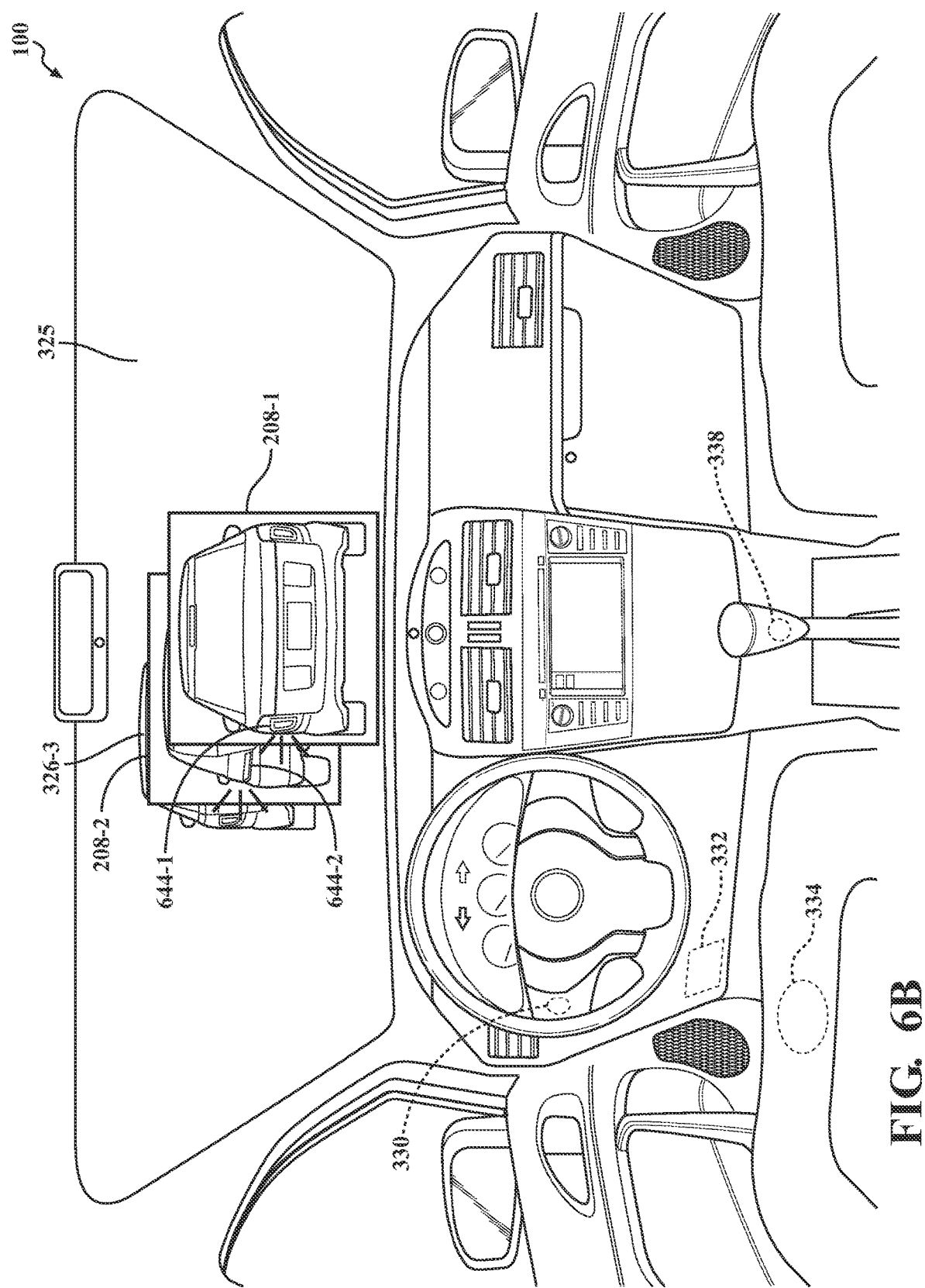

FIGS. 6A and 6B illustrate one embodiment of the AR synchronization system 170 that generates an AR overlay of synchronized exterior vehicle lights to reduce the sensory load of a vehicle driver. In some examples, it may be the case that the asynchronous real-world exterior vehicle lights may still be visible beneath the overlaid computer-generated synchronized lights. Accordingly, in an example, the synchronize module 218 includes instructions that cause the processor to conceal the asynchronous real-world exterior vehicle lights. FIGS. 6A and 6B depict such a process.

First, as depicted in FIG. 6A, the synchronize module 218 may acquire vehicle image(s) 208 or computer-generated representations of the neighboring vehicles 326 visible through the windshield 325. Specifically, the AR synchronization system 170, via any number of mechanisms such as image analysis, a look-up table, or other mechanism, may identify neighboring vehicles 326 in the field of view of the vehicle driver and retrieve the corresponding vehicle images 208. As described above, the database of vehicle images 208 may include representations of the neighboring vehicles 326 from various angles such that regardless of the perspective of the vehicle driver relative to the neighboring vehicles 326, an appropriate vehicle image 208 may be extracted.

As depicted in FIG. 6A, the vehicle image(s) 208 of the vehicle are superimposed over the real-world neighboring vehicle(s) 326 viewed through the windshield 325. Specifically, a first vehicle image 208-1, has already been superimposed over its respective real-world counterpart viewed through the windshield 325, a second vehicle image 208-2 is being superimposed over its respective real-world counterpart (i.e., the second neighboring vehicle 326-2), and an image corresponding to the third neighboring vehicle 326-3 has not yet been superimposed over its real-world counterpart (i.e., the third neighboring vehicle 3-3). Note that as described above, the vehicle images 208 may be vehicle images 208 where the turn signals are inactive. As such, the vehicle images 208 may conceal the asynchronous real-world turn signals 328 of the neighboring vehicles 326. As such, the synchronize module 218 includes instructions that cause the processor 210 to superimpose a digital vehicle image 208 of a neighboring vehicle 326 over the neighboring vehicle 326 as viewed through the AR display device 224 such that the digital vehicle image 208 of the neighboring vehicle 326 conceals the asynchronous real-world exterior vehicle light of the neighboring vehicle 326.

As depicted in FIG. 6B, with the real-world asynchronous exterior vehicle lights blocked, the synchronize module 218 superimposes the AR overlays of the computer-generated synchronized exterior vehicle lights 644-1 and 644-2 over the vehicle images 208-1 and 208-2 of the respective vehicles. That is, the synchronize module 218 includes instructions that cause the processor 210 to superimpose an AR overlay of computer-generated synchronized exterior vehicle lights 644 over the digital vehicle images 208 of the neighboring vehicles 326. In an example, the size and shape of the AR overlays may be the same regardless of the size and shape of the real-world turn signals. Thus, the AR synchronization system 170 systemizes the presentation of exterior vehicle lights to reduce the sensory impact on a vehicle driver.

As such, in FIG. 6A, the asynchronous vehicle exterior turn signals 328 are blocked while in FIG. 6B, computer-generated synchronous flashing lights are superimposed, thus resulting in an AR overlay of computer-generated synchronized exterior vehicle lights 644 over asynchronous exterior vehicle lights to reduce the sensory overload of the vehicle driver. As described above, the reduction in sensory overload may increase the overall safety and efficiency of road navigation as vehicle drivers who are otherwise compromised on account of sensory overload are returned to a state of mind where they may focus and properly appreciate and consider the environment in which they are found.

Figure 7:
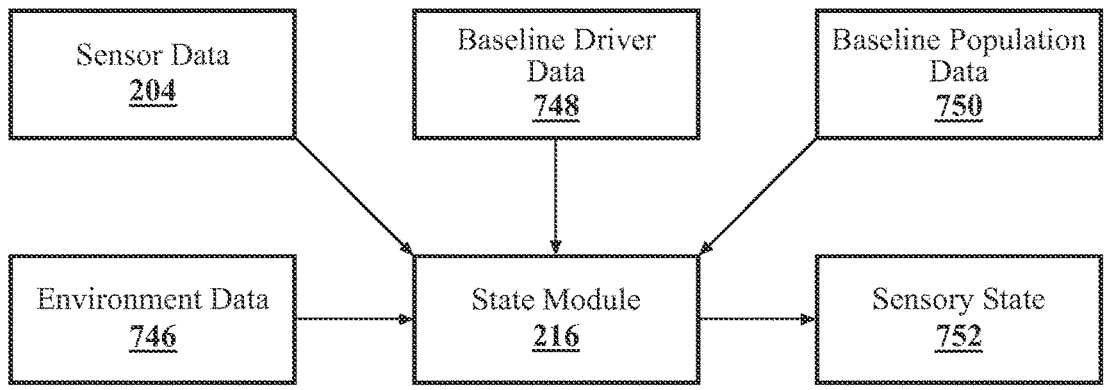
FIG. 7 illustrates one embodiment of a machine-learning AR synchronization system associated with synchronizing the presentation of exterior vehicle lights of nearby vehicles in an ego vehicle display.

FIG. 7 illustrates one embodiment of a machine-learning AR synchronization system 170 associated with synchronizing the presentation of exterior vehicle lights of neighboring vehicles 326 in an ego vehicle 100 display. In one approach, the state module 216 implements and/or otherwise uses a machine learning algorithm. A machine-learning algorithm generally identifies patterns and deviations based on previously unseen data. In the context of the present application, a machine-learning state module 216 relies on some form of machine learning, whether supervised, unsupervised, reinforcement, or any other type of machine learning, to identify patterns in vehicle drivers and other individuals' expected behavior and infers whether the vehicle driver is experiencing sensory overload based on such.

In one particular example, the machine-learning model may be a neural network that includes any number of 1) input nodes that receive sensor data 204 and environment data 746, 2) hidden nodes, which may be arranged in layers connected to input nodes and/or other hidden nodes and which include computational instructions for computing outputs, and 3) output nodes connected to the hidden nodes which generate an output indicative of the sensory state 752 of the vehicle driver.

In any case, as depicted in FIG. 7, the inputs to the state module 216 include the sensor data 204, the environment data 746, and baseline sensor data for the driver and other drivers. The state module 216 relies on a mapping between behavior patterns and sensory overload, determined from the training set, which includes baseline sensor data, to determine the likelihood of sensory overload of the driver based on the monitored behaviors and biometric data of that driver.

As described above, the state module 216 relies on baseline sensor data to infer the sensory state of the vehicle driver. Specifically, the state module 216 includes instructions that cause the processor 210 to compare the sensor data 204 to baseline sensor data, where the baseline sensor data includes historical data for the vehicle driver and/or historical sensor data for a different, or additional vehicle driver. That is, the state module 216 may acquire baseline driver data 748, stored as sensor data 204 in the data store 202, and baseline population data 750, which is also stored as sensor data 204 in the data store 202. The baseline sensor data may be characterized by whether or not it represents sensory overload. That is, the vehicle driver and other users may exhibit certain patterns when their senses are overstimulated and other patterns when their senses are not. The baseline sensor data may reflect both of these conditions, and the state module 216, whether supervised, unsupervised, or reinforcement-trained, may detect similarities between the behaviors of the vehicle driver with the patterns identified in the baseline driver data 748 and/or the baseline population data 750.

In this example, the state module 216, relying on a machine-learning state model 206 and environment data 746 indicating a potentially overstimulating sensory environment, generates an indication that the vehicle driver is in an overloaded sensory state 752. Note that the state model 206 may consider several factors when outputting an indication. That is, it may be that one characteristic by itself is inconclusive to determine sensory overload. As such, the state model 206 relies on multiple data points from sensor data 204 and the baseline sensor data to infer the sensory state 752 of the vehicle driver.

Note that in some examples, the machine-learning model is weighted to rely more heavily on baseline driver data 748 than baseline population data 750. That is, while certain global behaviors may indicate sensory overload, some users behave in a way that deviates from the global behavior but does not constitute sensory overload. For example, a vehicle driver may have a naturally elevated heart rate or change lanes more frequently than the general population. Given that it is the standard or baseline behavior for this particular vehicle driver, these behavior patterns may not indicate sensory overload. As such, the state model 206 may weigh the baseline driver data 748 more heavily than the baseline population data 750.

As stated above, the state model 206 considers different deviations when generating an indication of sensory overload. However, as each deviation from baseline data may not conclusively indicate sensory overload, the state model 206 considers and weights different deviations when generating the indication. For example, as described above, the state model 206 may consider the quantity, frequency, and degree of deviation between the sensor data 204 and the baseline data 748 and 750 when generating the indication.

In an example, if the deviation is greater by some threshold than the baseline sensor data, the state model 206 outputs an indication of the sensory state 752 of the vehicle driver, which indication may be binary or graduated. For example, if the frequency, quantity, and degree of deviation surpass a threshold, the state model 206 may indicate that the vehicle driver is sensory overloaded. By comparison, if the frequency, quantity, and degree of deviation do not surpass the threshold, the state model 206 may indicate that the vehicle driver is not sensory overloaded. In another example, the output may indicate a degree of sensory overload, which may be determined based on the frequency, quantity, and degree of deviation of the sensor data 204 from the baseline data 748 and 750.

In one configuration, the machine learning algorithm is embedded within the state module 216, such as a convolutional neural network (CNN) or an artificial neural network (ANN) to perform sensory overload classification over the sensor data 204 and output of the environment module 214 from which further information is derived. Of course, in further aspects, the state module 216 may employ different machine learning algorithms or implement different approaches for performing the sensory overload classification, which can include logistic regression, a naïve Bayes algorithm, a decision tree, a linear regression algorithm, a k-nearest neighbor algorithm, a random forest algorithm, a boosting algorithm, and a hierarchical clustering algorithm among others to generate sensory overload classifications. Other examples of machine learning algorithms include but are not limited to deep neural networks (DNN), including transformer networks, convolutional neural networks, recurrent neural networks (RNN), Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the AR synchronization system 170 or another system generally trains the machine learning algorithm according to a particular training approach, which may include supervised training, self-supervised training, reinforcement learning, and so on. In contrast to training/learning of the machine learning algorithm, the AR synchronization system 170 implements the machine learning algorithm to perform inference. Thus, the general use of the machine learning algorithm is described as inference.

FIG. 8 illustrates one embodiment of the AR synchronization system 170 of FIG. 2 in a cloud-computing environment. In one or more approaches, the cloud environment 800 may facilitate communications between the sensor system 120 of a neighboring vehicle 326 and the ego sensor 856 that may be on the person of a vehicle driver 854. Specifically, in various embodiments, the AR synchronization system 170 communicates with the sensors through a cloud-based service.

Accordingly, as shown, the AR synchronization system 170 may include separate instances within one or more entities of the cloud-based environment 800, such as servers, and also instances within vehicles that function cooperatively to acquire, analyze, and distribute the noted information. In any event, via this network and the communication system 280 link between the AR synchronization system 170 and the entities of the cloud-based environment, the AR synchronization system 170 can communicate with various sensors/entities to receive/transmit information to 1) identify those vehicle drivers that may be experiencing sensory overload and 2) synchronize exterior vehicle lights of those vehicles in the vicinity of the vehicle driver to reduce the sensory load on the vehicle driver.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 110. In one or more arrangements, the processor(s) 110 can be a primary/centralized processor of the vehicle 100 or may be representative of many distributed processing units. For instance, the processor(s) 110 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 100.

The vehicle 100 can include one or more data stores 115 for storing one or more types of data. The data store 115 can be comprised of volatile and/or non-volatile memory. Examples of memory that may form the data store 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 115 is a component of the processor(s) 110. In general, the data store 115 is operatively connected to the processor(s) 110 for use thereby. The term "operatively connected," as used throughout this description, can include direct or indirect connections, including connections without direct physical contact.

In one or more arrangements, the one or more data stores 115 include various data elements to support functions of the vehicle 100, such as semi-autonomous and/or autonomous functions. Thus, the data store 115 may store map data 116 and/or sensor data 119. The map data 116 includes, in at least one approach, maps of one or more geographic areas. In some instances, the map data 116 can include information about roads (e.g., lane and/or road maps), traffic control devices, road markings, structures, features, and/or landmarks in the one or more geographic areas. The map data 116 may be characterized, in at least one approach, as a high-definition (HD) map that provides information for autonomous and/or semi-autonomous functions.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. In one or more arrangements, the map data 116 includes one or more static obstacle maps 118. The static obstacle map(s) 118 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 119 is data provided from one or more sensors of the sensor system 120. Thus, the sensor data 119 may include observations of a surrounding environment of the vehicle 100 and/or information about the vehicle 100 itself. In some instances, one or more data stores 115 located onboard the vehicle 100 store at least a portion of the map data 116 and/or the sensor data 119. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 120 and/or the one or more sensors can be operatively connected to the processor(s) 110, the data store(s) 115, and/or another element of the vehicle 100.

Various examples of different types of sensors will be described herein. However, it will be understood that the embodiments are not limited to the particular sensors described. In various configurations, the sensor system 120 includes one or more vehicle sensors 121 and/or one or more environment sensors. The vehicle sensor(s) 121 function to sense information about the vehicle 100 itself. In one or more arrangements, the vehicle sensor(s) 121 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 120 can include one or more environment sensors 122 that sense a surrounding environment (e.g., external) of the vehicle 100 and/or, in at least one arrangement, an environment of a passenger cabin of the vehicle 100. For example, the one or more environment sensors 122 sense objects in the surrounding environment of the vehicle 100. Such obstacles may be stationary objects and/or dynamic objects. Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 includes one or more radar sensors 123, one or more LiDAR sensors 124, one or more sonar sensors 125 (e.g., ultrasonic sensors), and/or one or more cameras 126 (e.g., monocular, stereoscopic, RGB, infrared, etc.).

Continuing with the discussion of elements from FIG. 1, the vehicle 100 can include an input system 130. The input system 130 generally encompasses one or more devices that enable the acquisition of information by a machine from an outside source, such as an operator. The input system 130 can receive an input from a vehicle passenger (e.g., a driver/operator and/or a passenger). Additionally, in at least one configuration, the vehicle 100 includes an output system 135. The output system 135 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 140. Various examples of the one or more vehicle systems 140 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 141, a braking system 142, a steering system 143, a throttle system 144, a transmission system 145, a signaling system 146, and a navigation system 147.

The navigation system 147 can include one or more devices, applications, and/or combinations thereof to determine the geographic location of the vehicle 100 and/or to determine a travel route for the vehicle 100. The navigation system 147 can include one or more mapping applications to determine a travel route for the vehicle 100 according to, for example, the map data 116. The navigation system 147 may include or at least provide a connection to a global positioning system, a local positioning system, or a geolocation system.

In one or more configurations, the vehicle systems 140 function cooperatively with other components of the vehicle 100. For example, the processor(s) 110, the AR synchronization system 170, and/or automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the navigation and/or maneuvering of the vehicle 100. The processor(s) 110, the AR synchronization system 170, and/or the automated driving module(s) 160 may control some or all of these vehicle systems 140.

For example, when operating in the autonomous mode, the processor(s) 110, the automated driving module(s) 160 control the heading and speed of the vehicle 100. The processor(s) 110 and/or the automated driving module(s) 160 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 150 in at least one configuration. The actuators 150 are, for example, elements operable to move and/or control a mechanism, such as one or more of the vehicle systems 140 or components thereof responsive to electronic signals or other inputs from the processor(s) 110 and/or the automated driving module(s) 160. The one or more actuators 150 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 110, implement one or more of the various functions described herein. In various arrangements, one or more of the modules are a component of the processor(s) 110, or one or more of the modules are executed on and/or distributed among other processing systems to which the processor(s) 110 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 160. The automated driving module(s) 160, in at least one approach, receive data from the sensor system 120 and/or other systems associated with the vehicle 100. In one or more arrangements, the automated driving module(s) 160 use such data to perceive a surrounding environment of the vehicle. The automated driving module(s) 160 determine a position of the vehicle 100 in the surrounding environment and map aspects of the surrounding environment. For example, the automated driving module(s) 160 determines the location of obstacles or other environmental features including traffic signs, trees, shrubs, neighboring vehicles, pedestrians, etc.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or another source. In general, the automated driving module(s) 160 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. The systems, components, and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
   a processor; and
   a memory storing machine-readable instructions that, when executed by the processor, cause the processor to:
   assess a sensory environment of a vehicle driver;
   determine that the vehicle driver is in a sensory-overloaded state based on:
      a characteristic of the sensory environment;
      physiological sensor data for the vehicle driver; and
      driving behavior sensor data; and
   superimpose an augmented reality (AR) overlay of computer-generated synchronized exterior vehicle lights over asynchronous real-world exterior vehicle lights viewed through an AR display device of a vehicle based on a determination that the vehicle driver is in the sensory-overloaded state.

2. The system of claim 1, wherein the machine-readable instruction that, when executed by the processor, causes the processor to superimpose the AR overlay of computer-generated synchronized exterior vehicle lights over the asynchronous real-world exterior vehicle lights comprises machine-readable instructions that, when executed by the processor, cause the processor to:
   superimpose a digital vehicle image of a neighboring vehicle over the neighboring vehicle viewed through the AR display device, wherein the digital vehicle image conceals the asynchronous real-world exterior vehicle lights of the neighboring vehicle; and
   superimpose the AR overlay of computer-generated synchronized exterior vehicle lights over the digital vehicle image.

3. The system of claim 1, wherein the machine-readable instructions further comprise a machine-readable instruction that, when executed by the processor, causes the processor to synchronize at least one of a turn signal visual indicator or a turn signal audio indicator with the computer-generated synchronized exterior vehicle lights.

4. The system of claim 1, wherein the machine-readable instructions further comprise a machine-readable instruction that, when executed by the processor, causes the processor to disable at least one of a turn signal visual indicator or a turn signal audio indicator responsive to a generation of the computer-generated synchronized exterior vehicle lights.

5. The system of claim 1, wherein the machine-readable instructions further comprise a machine-readable instruction that, when executed by the processor, causes the processor to synchronize a turn signal lamp of the vehicle with the computer-generated synchronized exterior vehicle lights.

6. The system of claim 1, wherein the machine-readable instruction that, when executed by the processor, causes the processor to assess the sensory environment of the vehicle driver comprises a machine-readable instruction that, when executed by the processor, causes the processor to:
   assess an external sensory environment of the vehicle driver; and
   assess an in-cabin sensory environment of the vehicle driver.

7. The system of claim 1, wherein the machine-readable instruction that, when executed by the processor, causes the processor to determine that the vehicle driver is in the sensory-overloaded state comprises a machine-readable instruction that, when executed by the processor, causes the processor to assess at least one of biometric data for the vehicle driver or images of the vehicle driver to determine that the vehicle driver is in the sensory-overloaded state.

8. The system of claim 1, wherein the machine-readable instruction that, when executed by the processor, causes the processor to determine that the vehicle driver is in the sensory-overloaded state comprises a machine-readable instruction that, when executed by the processor, causes the processor to assess sensor data indicative of a driver interaction with a vehicle system.

9. The system of claim 1, wherein the machine-readable instruction that, when executed by the processor, causes the processor to determine that the vehicle driver is in the sensory-overloaded state comprises a machine-readable instruction that, when executed by the processor, causes the processor to assess environment sensor data indicative of a surrounding environment of the vehicle.

10. The system of claim 1, wherein:
   the machine-readable instruction that, when executed by the processor, causes the processor to determine that the vehicle driver is in the sensory-overloaded state comprises a machine-learning instruction that, when executed by the processor, causes the processor to compare the physiological sensor data and the driving behavior sensor data to baseline sensor data; and
   the baseline sensor data comprises at least one of:
      historical data for the vehicle driver; or
      historical data for an additional vehicle driver.

11. The system of claim 1, wherein the machine-readable instructions further comprise a machine-readable instruction that, when executed by the processor, causes the processor to produce a notification of a sensory-overloaded vehicle driver to at least one of:
- another human vehicle operator;
- an autonomous vehicle system; or
- an infrastructure element.

12. A non-transitory machine-readable medium comprising instructions that, when executed by a processor, cause the processor to:
- assess a sensory environment of a vehicle driver;
- determine that the vehicle driver is in a sensory-overloaded state based on:
  - a characteristic of the sensory environment;
  - physiological sensor data for the vehicle driver; and
  - driving behavior sensor data; and
- superimpose an augmented reality (AR) overlay of computer-generated synchronized exterior vehicle lights over asynchronous real-world exterior vehicle lights viewed through an AR display device of a vehicle based on a determination that the vehicle driver is in the sensory-overloaded state.

13. The non-transitory machine-readable medium of claim 12, wherein the instruction that, when executed by the processor, causes the processor to superimpose the AR overlay of computer-generated synchronized exterior vehicle lights over the asynchronous real-world exterior vehicle lights comprises instructions that, when executed by the processor, cause the processor to:
- superimpose a digital vehicle image of a neighboring vehicle over the neighboring vehicle viewed through the AR display device, wherein the digital vehicle image conceals the asynchronous real-world exterior vehicle lights of the neighboring vehicle; and
- superimpose the AR overlay of computer-generated synchronized exterior vehicle lights over the digital vehicle image.

14. The non-transitory machine-readable medium of claim 12, wherein the instructions further comprise an instruction that, when executed by the processor, causes the processor to synchronize at least one of a turn signal visual indicator or a turn signal audio indicator with the computer-generated synchronized exterior vehicle lights.

15. The non-transitory machine-readable medium of claim 12, wherein:
- the instruction that, when executed by the processor, causes the processor to determine that the vehicle driver is in the sensory-overloaded state comprises an instruction that, when executed by the processor, causes the processor to compare the physiological sensor data and the driving behavior sensor data to baseline sensor data; and
- the baseline sensor data comprises at least one of:
  - historical data for the vehicle driver; or
  - historical data for an additional vehicle driver.

16. The non-transitory machine-readable medium of claim 12, wherein the instruction that, when executed by the processor, causes the processor to determine that the vehicle driver is in the sensory-overloaded state comprises at least one of:
- an instruction that, when executed by the processor, causes the processor to assess sensor data indicative of a driver interaction with a vehicle system; or
- an instruction that, when executed by the processor, causes the processor to assess environment sensor data indicative of a surrounding environment of the vehicle.

17. A method, comprising:
- assessing a sensory environment of a vehicle driver;
- determining that the vehicle driver is in a sensory-overloaded state based on:
  - a characteristic of the sensory environment;
  - physiological sensor data for the vehicle driver; and
  - driving behavior sensor data; and
- superimposing an augmented reality (AR) overlay of computer-generated synchronized exterior vehicle lights over asynchronous real-world exterior vehicle lights viewed through an AR display device of a vehicle based on a determination that the vehicle driver is in the sensory-overloaded state.

18. The method of claim 17, wherein superimposing the AR overlay of computer-generated synchronized exterior vehicle lights over asynchronous real-world exterior vehicle lights comprises:
- superimposing a digital vehicle image of a neighboring vehicle over the neighboring vehicle viewed through the AR display device, wherein the digital vehicle image conceals the asynchronous real-world exterior vehicle lights of the neighboring vehicle; and
- superimposing the AR overlay of computer-generated synchronized exterior vehicle lights over the digital vehicle image.

19. The method of claim 17, wherein synchronizing at least one of a turn signal visual indicator or a turn signal audio indicator with the computer-generated synchronized exterior vehicle lights.

20. The method of claim 17, wherein determining that the vehicle driver is in the sensory-overloaded state comprises at least one of:
- assessing sensor data indicative of a driver interaction with a vehicle system; or
- assessing environment sensor data indicative of a surrounding environment of the vehicle.

* * * * *